United States Patent
Ikeno et al.

(10) Patent No.: US 8,702,431 B2
(45) Date of Patent: Apr. 22, 2014

(54) VASCULAR STENOSIS MODEL

(75) Inventors: Jun Ikeno, Izumiotsu (JP); Kazuo Sato, Osaka (JP)

(73) Assignee: Asahi Intecc Co., Ltd., Nagoya-shi (JP)

( * ) Notice: Subject to any disclaimer, the term of this patent is extended or adjusted under 35 U.S.C. 154(b) by 20 days.

(21) Appl. No.: 13/552,086

(22) Filed: Jul. 18, 2012

(65) Prior Publication Data

US 2013/0022952 A1 Jan. 24, 2013

(30) Foreign Application Priority Data

Jul. 20, 2011 (JP) .................................. 2011-159096

(51) Int. Cl.
*G09B 23/28* (2006.01)

(52) U.S. Cl.
USPC .......................................................... 434/267

(58) Field of Classification Search
USPC .......................... 434/262, 267, 268, 270, 272
See application file for complete search history.

(56) References Cited

U.S. PATENT DOCUMENTS

| | | | | |
|---|---|---|---|---|
| 3,226,846 | A | * | 1/1966 | Wood ............................ 434/272 |
| 3,579,858 | A | * | 5/1971 | Bentov ......................... 434/272 |
| 4,198,766 | A | * | 4/1980 | Camin .......................... 434/272 |
| 4,726,772 | A | * | 2/1988 | Amplatz ....................... 434/272 |
| 5,112,228 | A | * | 5/1992 | Zouras .......................... 434/272 |
| 7,993,140 | B2 | * | 8/2011 | Sakezles ....................... 434/267 |
| 8,469,717 | B2 | * | 6/2013 | Park et al. .................... 434/268 |
| 2007/0148626 | A1 | * | 6/2007 | Ikeda ............................ 434/272 |

FOREIGN PATENT DOCUMENTS

| JP | A-2001-343891 | 12/2001 |
|---|---|---|
| JP | A-2006-267565 | 10/2006 |
| JP | A-2008-237304 | 10/2008 |

* cited by examiner

*Primary Examiner* — Kurt Fernstrom
(74) *Attorney, Agent, or Firm* — Oliff PLC (57) ABSTRACT

A vascular stenosis model includes a stenosis region model and a transparent holding die including a groove that enables the stenosis region model to be held. The transparent holding die includes a first member and a second member that are separable from each other. In vertical sectional view of the transparent holding die, the groove is positioned at either an upper side or a lower side of a boundary between the first member and the second member.

7 Claims, 5 Drawing Sheets

VASCULAR STENOSIS MODEL

CROSS-REFERENCE TO RELATED APPLICATION

The present application claims priority to Japanese Patent Application No. 2011-159096 filed in the Japan Patent Office on Jul. 20, 2011, the entire contents of which are incorporated herein by reference.

BACKGROUND

The disclosed embodiments relate to a medical model. More specifically, the disclosed embodiments relate to a vascular stenosis model. In recent years, percutaneous coronary intervention (hereunder referred to as "PCI") has been performed as a method of treating, for example, ischemic heart disease that develops when a portion of a coronary artery that nourishes the heart is narrowed, and various trainer vascular models for training a person on how to perform PCI treating methods have been proposed.

For example, Japanese Unexamined Patent Application Publication No. 2001-343891 (PTL 1) discusses a PTCA trainer including a flat plate and a transparent plate that covers the flat plate. The flat plate has in its surface a recessed path into which a long object, such as a guidewire, is insertable. As used herein, "PTCA" means percutaneous transluminal coronary angioplasty, which is currently often called PCI.

Japanese Unexamined Patent Application Publication No. 2006-267565 (PTL 2) discusses a human body model including a mannequin body formed of a transparent material, a vascular model supported by a partition member that is built in the mannequin body, and an assistive instrument for operating the vascular model.

Japanese Unexamined Patent Application Publication No. 2008-237304 (PTL 3) discusses a vascular simulation model including an arterial line, a vascular line, and a connector that connects the arterial line and the vascular line. In the vascular simulation model, the connector has a double-tube structure and includes a male connecting portion and a female connecting portion.

SUMMARY

However, in the PTCA trainer in PTL 1, although when operating, for example, a guidewire, it is possible to confirm the position of a distal end of the guidewire in a direction from the transparent plate towards the flat plate, it is not possible to confirm the position of the distal end of, for example, the guidewire from a direction that is orthogonal to this direction (that is, in a direction of a vertical section of the PTCA trainer). Therefore, the visibility at the distal end of, for example, the guidewire is not satisfactory, as a result of which the precision of the PCI training is low. Therefore, the PCI training cannot be satisfactorily performed.

In the human body model in PTL 2, the transparent mannequin body and the vascular model disposed in the transparent mannequin body have three-dimensional shapes. Therefore, visibility is blocked by other vascular models in which, for example, a guidewire is not inserted, as a result of which visibility at the distal end of the guidewire is not satisfactory. Therefore, precise training cannot be performed. In addition, since the size of the human body model is the same as the size of a human body, setting up the human body model can be time consuming.

Even, in the vascular simulation model in PTL 3, like the human body model in PTL 2, the vascular model has a three-dimensional shape, as a result of which visibility is blocked by other vascular models in which, for example, a guidewire is not inserted. Therefore, visibility at the distal end of, for example, the guidewire is not satisfactory. Consequently, precise training cannot be performed. In addition, it takes time to connect the arterial line and the vascular line using the connector.

In view of such problems, it is an object of the embodiments of the present invention to provide a vascular stenosis model that can increase the precision of PCI training and that can be easily used as a result of increasing visibility at a distal end of a medical device, such as a guidewire, that passes through a stenosis region model.

According to the embodiments of the present invention, there is provided a vascular stenosis model including a stenosis region model and a transparent holding die including at least one groove that enables the stenosis region model to be held. The holding die includes a first member and a second member that are separable from each other. In vertical sectional view of the holding die, the at least one groove of the holding die is positioned at either an upper side or a lower side of a boundary between the first member and the second member.

The vascular stenosis model is such that, in vertical sectional view of the transparent holding die, the groove of the transparent holding die that holds the stenosis region model is positioned at either the upper side or the lower side of the boundary between the first member and the second member of the transparent holding die. Therefore, when a person looks through a medical device, such as a guidewire, the boundary does not overlap the medical device, such as a guidewire. Consequently, it is possible to increase visibility at the distal end of the medical device, such as a guidewire, that passes through the vascular stenosis model, and, thus, it is possible to increase the precision of PCI training. In addition, the vascular stenosis model only includes a stenosis region model and a transparent holding die that contains the stenosis region model. Since the structure is very simple, it is possible to easily perform PCI training without wasting time setting up the vascular stenosis model.

DETAILED DESCRIPTION OF EMBODIMENTS

A vascular stenosis model according to an embodiment of the present invention will hereunder be described on the basis of the embodiments illustrated in the drawings.

Figure 1A:
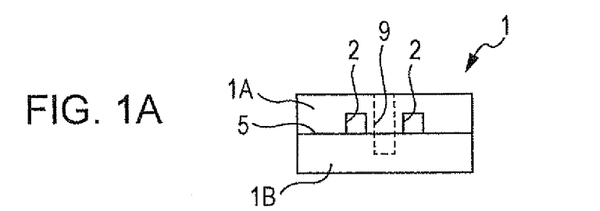
FIGS. 1A to 1C are structural views of a first embodiment of the present invention, with FIG. 1A being a front view of a vascular stenosis model, FIG. 1B being a plan view of the vascular stenosis model, and FIG. 1C being a side view of the vascular stenosis model.
Figure 1B:
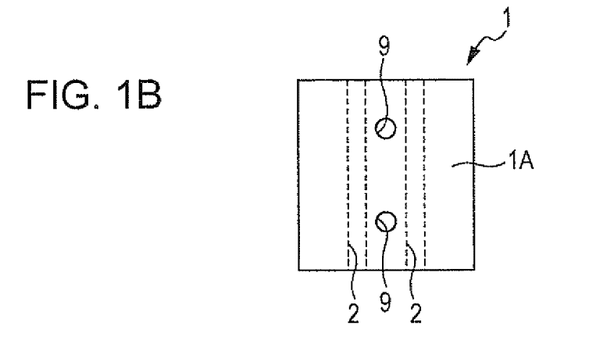
Figure 1C:
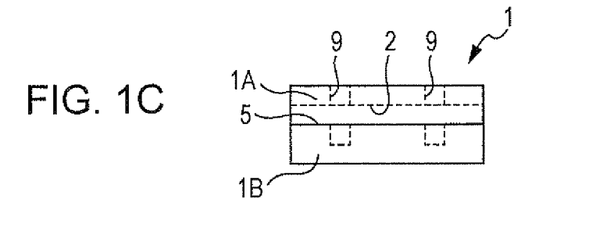
Figure 1D:
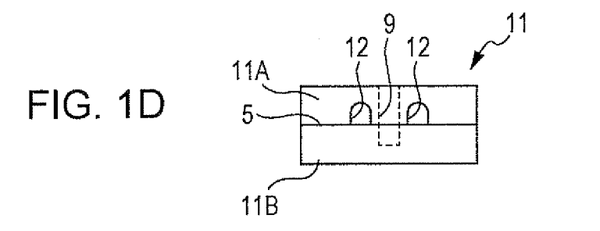
FIGS. 1D and 1E illustrate a modification of the first embodiment, with FIG. 1D being a front view of the modification and FIG. 1E illustrating modified grooves.
Figure 1E:
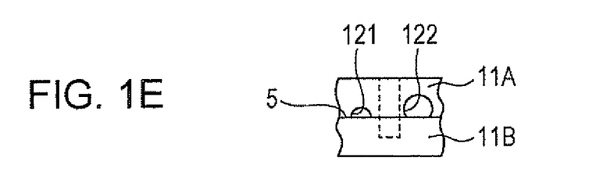

FIGS. 1A to 1C are structural views of a vascular stenosis model 1 according to a first embodiment of the present invention, with FIG. 1A being a front view of the vascular stenosis model 1, FIG. 1B being a plan view of the vascular stenosis model 1, and FIG. 1C being a side view (right side view) of the vascular stenosis model 1. FIGS. 1D and 1E illustrate a vascular stenosis model 11 being a modification of the first embodiment. The vascular stenosis model 11 will be described in detail after describing the vascular stenosis model 1 according to the first embodiment.

For the sake of easier understanding, in all of FIGS. 1A to 1E, with the scales of the vascular stenosis model 1 in a lengthwise direction and a widthwise direction being changed, the vascular stenosis model 1 is schematically illustrated as a whole. Therefore, the overall dimensions may differ from the actual dimensions.

In FIG. 1A, the vascular stenosis model 1 includes a holding die, grooves 2, a stenosis region model, and securing holes 9. The holding die includes a first member (upper die) 1A and a second member (lower die) 1B that is separable from the first member 1A. The grooves 2 are provided in the first member 1A. The stenosis region model is disposed in the grooves 2. The securing holes 9 are for securing the first member 1A and the second member 1B with, for example, screws. When securing the first member 1A and the second member 1B, joining surfaces thereof are coupled, so that a boundary 5 is formed. The first member 1A and the second member 1B of the holding die may both be formed of transparent resin materials. Accordingly, it is possible to observe a stenosis region model provided in the grooves 2 from outside the holding die.

In the side view of FIG. 1C (that is, vertical sectional view of the holding die), the grooves 2 are positioned at the upper side of the boundary 5 over the entire length of the grooves 2. Although, in the embodiment, the lower surfaces of the grooves 2 are disposed so as to contact the boundary 5, the lower surfaces of the grooves 2 may be provided so as to be separated from the boundary 5, at the upper side of the boundary 5. As is clear from FIGS. 1B and 1C, the grooves 2 are provided so as to extend over the entire length of the holding die. Further, two grooves 2 are disposed side by side in the holding die. The grooves 2 may have rectangular shapes in transverse sectional view.

As shown in FIG. 1B, the securing holes 9 for securing the first member 1A and the second member 1B of the holding die are disposed inwardly of the two grooves 2 that are disposed side by side in the holding die.

Accordingly, the transparent holding die of the vascular stenosis model 1 includes the first member 1A having the grooves 2, and the second member 1B. In addition, the stenosis region model is provided in the grooves 2. Further, in vertical sectional view of the holding die, the grooves 2 are positioned at the upper side of the boundary 5 serving as a joining plane between the first member 1A and the second member 1B of the holding die. Therefore, when a medical device, such as a guidewire, is inserted into the grooves 2 (a.k.a. stenosis region model) and the grooves 2 (a.k.a. stenosis region model) are observed from above the vascular stenosis model 1, the medical device does not overlap the boundary 5. Consequently, visibility at a distal end of the medical device that passes through the vascular stenosis model 1 is increased. Consequently, a person who performs training is more capable of operating the medical device while looking through the distal end of the medical device. Thus, it is possible to increase the precision of PCI training. In addition, the vascular stenosis model 1 only includes a stenosis region model and a transparent holding die that contains the stenosis region model. Moreover, because the structure is very simple, it is possible to easily perform PCI training without wasting valuable time setting up the vascular stenosis model 1.

Next, the material of each structural element will be described.

The first member 1A and the second member 1B of the holding die may be formed of transparent resin materials. Although not particularly limited, the transparent resin materials are selectable from, for example, acrylic resin, methacrylic resin, polyamide, styrenic resin, and silicon resin. The resins of the first member 1A and the second member 1B carry the stenosis region model in the interior of the holding die, so that is desirable to form the first member 1A and the second member 1B using resins having a relatively high hardness. From such a viewpoint, the first member 1A and the second member 2A may be desirably formed of acrylic resin, methacrylic resin, or polyamide, having high transparency and hardness.

The stenosis region model that is set in the grooves 2 of the first member 1A of the holding die may be formed of a resin material. It is desirable to use a gel having elasticity and mechanical strength. Thus, a gel, an organogel and/or a hydrogel may be used. Considering the viewpoint of forming the holding die using a resin material, it is desirable to use hydrogel which is capable of containing water having high polarity as solvent. Cross-linking of the gel may be either physical cross-linking or chemical cross-linking.

Such hydrogel materials are not particularly limited. Examples thereof include polyacrylic acid, polymethacrylic acid, polyacrylamide, polyvinyl alcohol, polyhydroxyethyl methacrylate, and agarose. When the resin material forming the hydrogel and the resin material forming the holding die are formed of a similar type (for example, the hydrogel material is polyacrylic acid and the holding die is formed of acrylic material), adhesion occurs between the gel and the holding die. Therefore, when inserting a medical device, such as a guidewire, into the vascular stenosis model 1, it is possible to prevent the stenosis region model from separating from the holding die, thereby making it possible to perform precise PCI training.

By using similar types of materials, the refractive indices can be made the same. Therefore, even if a vascular stenosis model has three-dimensional paths, such as that described below is formed, it is possible to ensure visibility.

When producing the gel, it is possible to cause chemical cross-linking to occur using a cross-linking agent that reacts with a resin component of the gel, or to increase physical cross-linking by increasing the concentration of the resin material of the gel, so that the stenosis region model is caused to have an arbitrary hardness.

In a method of producing such a vascular stenosis model 1, a first member 1A and a second member 1B are provided by cutting, for example, a mass of acrylic resin (with parallelepiped form) and then polishing it for ensuring transparency at the cut surface; or two acrylic resins with parallelepiped form are used as they are as a first member 1A and a second member 1B, to provide the first member 1A and the second member 1B.

Next, using a grinding machine or a cutting machine, grooves 2 and a securing hole 9 are formed in the first member 1A, and a securing hole 9 is formed in the second member 1B. The securing holes 9 may be threaded for securing with screws.

Next, gel having the same size as the grooves 2 is formed by, for example, casting, to form a stenosis region model. The stenosis region model may be fitted into the grooves 2 or gel formation material may be casted into the grooves 2 in the first member 1A, to form the stenosis region model in the grooves 2. When the gel formation material is casted into the first member 1A, it is necessary to seal end portions of the grooves 2 so that the gel formation material does not flow out from the end portions of the grooves 2. In addition, when the resin material of the gel is casted into the first member 1A, the first member 1A and the second member 1B may be used as a formation die used to form the stenosis region model.

When forming the stenosis region model in the grooves 2, in order to ensure visibility, it is necessary not to form an air layer at an interface between the stenosis region model and the grooves 2.

Finally, screws are screwed into the securing holes 9 in the first member 1A and the second member 1B, to secure the first member 1A and the second member 1B, so that the vascular stenosis model 1 can be formed. The method of forming the vascular stenosis model 1 is not limited to this method. In fact, other methods, as may occur to those having ordinary skill in the art, may be used to form the vascular stenosis model 1.

FIG. 1D is a plan view of a vascular stenosis model 11, which is a modification of the first embodiment. As is clear from FIG. 1D, in transverse sectional view, the grooves 12 provided in the first member 11A of the holding die of the vascular stenosis model 11 are semicircular. The side view of the vascular stenosis model 11 is the same as the side view of FIG. 1C, and shows that the grooves 12 are positioned at the upper side of a boundary 5 in vertical sectional view of the holding die.

Since the grooves 12 of the vascular stenosis model 11 are semicircular in transverse sectional view, edge portions that are positioned at vertices of upper halves in a rectangular section do not exist. Therefore, it is possible to increase visibility of the stenosis region model from outside the holding die, and, thus, to further increase the precision of PCI training.

The semicircular shape of the grooves 12 of the vascular stenosis model 11 is not limited to the shape of the grooves 12 shown in FIG. 1D. For example, in other embodiments, as shown in FIG. 1E, the shape of the grooves 12 may be a semicircular shape 121 formed by dividing a circle in two, or to a semicircular shape 122 having the form of a tunnel, and whose center of a circle is positioned at the upper side of the boundary 5.

In vertical sectional view of the holding die, the grooves 2 of the vascular stenosis model 1 according to the first embodiment illustrated in FIGS. 1A to 1C and the grooves 12 of the vascular stenosis model 11 according to the modification are both positioned at the upper side of the boundary 5. Although, the lower surfaces of the grooves 12 are disposed so as to contact the boundary 5, the lower surfaces of the grooves 12 may be provided so as to be separated from the boundary 5 at the upper side of the boundary 5. Although this is desirable from the viewpoint of increasing visibility of the stenosis region model or visibility at a medical device, such as a guidewire, the grooves 2 or the grooves 12 may be positioned at the lower side of the boundary 5 over the entire length of the grooves 2 in vertical sectional view of the holding die or over the entire length of the grooves 12 in vertical sectional view of the holding die so that the upper surfaces of the grooves 2 or the upper surfaces of the grooves 12 contact or are separated from the boundary 5. In the case where the grooves 2 or the grooves 12 are positioned at the lower side of the boundary 5 in this way, when the grooves 2 (stenosis region model) are viewed edge-on from the vascular stenosis model 1 (that is, from the direction of FIG. 1C), the boundary 5 does not overlap the grooves 2 (stenosis region model). Therefore, visibility is increased.

As is clear from FIG. 1C, when the grooves 2 are provided in the first member (upper die), the grooves 2 are always positioned at the upper side of the boundary 5. In contrast, when the grooves 2 are provided in the second member (lower die) 1B, the grooves 2 are always positioned at the lower side of the boundary 5. Therefore, it is necessary to form one of the grooves 2 in either one of the first member (upper die) and the second member (lower die).

From the viewpoint of making it possible to perform a plurality of trainings using one vascular stenosis model 1, it is desirable to provide two or more grooves 2. Alternatively, it is possible to form only one groove 2.

When two grooves 2 are formed, from the viewpoint of visibility of the stenosis region model disposed in the grooves 2, it is desirable that the two grooves 2 be positioned at the upper side of the boundary 5 as illustrated in FIG. 1C. Alternatively, it is possible to dispose one of the grooves 2 at the upper side of the boundary 5 (that is, provide one of the grooves 2 in the first member 1A) and dispose the other groove 2 at the lower side of the boundary 5 (that is, provide the other groove in the second member 1B).

When performing PCI training using the vascular stenosis model 1, the vascular stenosis model 1 may be provided with means for securing the vascular stenosis model 1 and, for example, a tabletop using, for example, a clamp for securing the vascular stenosis model 1 to the tabletop or a jig.

Next, a vascular stenosis model 21 according to a second embodiment will be described with reference to FIGS. 2A to 2C while focusing on its differences from the first embodiment. Portions corresponding to those of the first embodiment will be given the same reference numerals in FIGS. 2A to 2C.

Figure 2A:
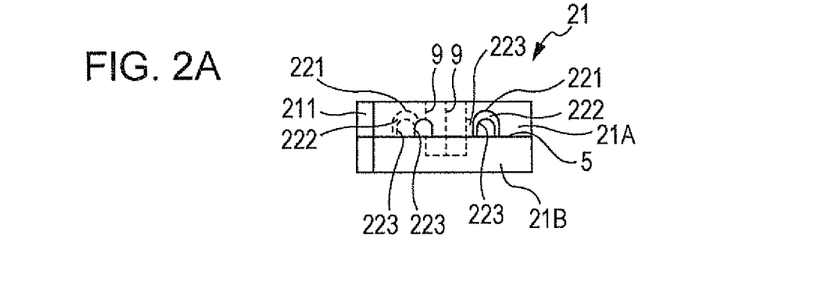
FIGS. 2A to 2C are structural views of a second embodiment of the present invention, with FIG. 2A being a front view of a vascular stenosis model, FIG. 2B being a plan view of the vascular stenosis model, and FIG. 2C being a right side view of the vascular stenosis model.
Figure 2B:
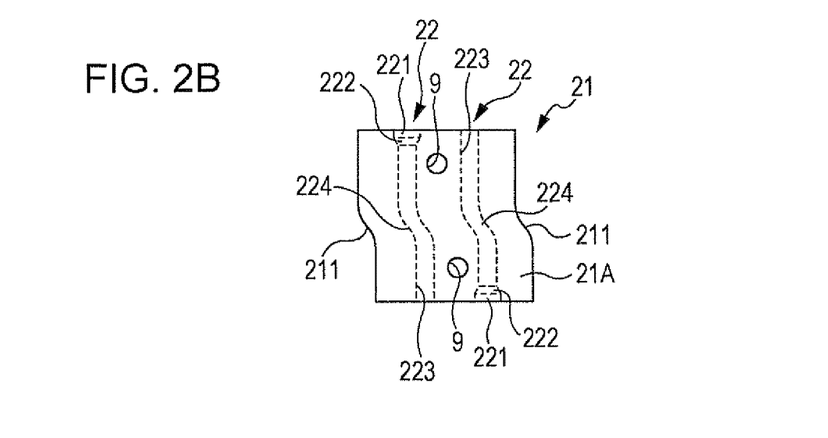
Figure 2C:
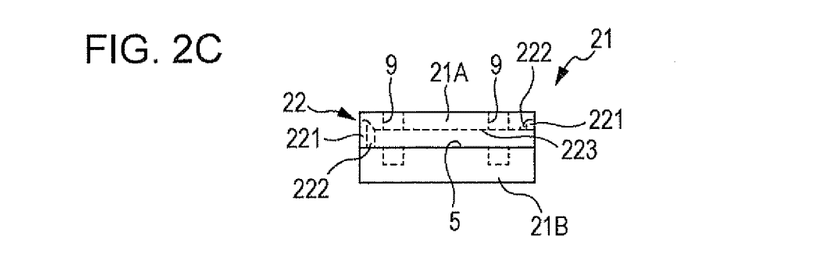

For the sake of easier understanding, in all of FIGS. 2A to 2C, with the scales of the vascular stenosis model 21 in a lengthwise direction and a widthwise direction being changed, the vascular stenosis model 21 is schematically illustrated as a whole. Therefore, the overall dimensions may differ from the actual dimensions.

FIG. 2A is a front view of the vascular stenosis model 21. FIG. 2B is a plan view of the vascular stenosis model 21. FIG. 2C is a side view (right side view) of the vascular stenosis model 21. As shown in FIGS. 2A to 2C, the vascular stenosis model 21 differs from the vascular stenosis model 1 according to the first embodiment and the vascular stenosis model 11 in that the first member 21A and the second member 21B of a holding die each have a curved portion 211; each groove 22 in the first member 21A includes an enlarged opening 221 (serving as an entrance of the corresponding groove 22), a groove path portion 223, and a shape transition portion 222 (positioned between the enlarged opening 221 and the groove path portion 223); and a groove curved portion 224 is formed in the groove path portion 223 of each groove 22, with each groove portion 223 being curved by the corresponding groove curved portion 224.

The enlarged opening 221 of each groove 22 corresponds to the entrance of the corresponding groove 22. The shape transition portion 222 that is positioned at a proximal end of each enlarged opening 221 opens so as to become wider from an exit towards the entrance so that the enlarged opening 221 and the groove path 223 positioned at a proximal-end side of the corresponding shape transition portion 222 (that is, an exit side) are connected to each other.

Accordingly, the vascular stenosis model 21 according to the second embodiment is such that each shape transition portion 222 existing near the entrance of the corresponding groove 22 opens so as to become wider from the exit towards the entrance of the corresponding groove 22. Therefore, even if, when inserting a medical device (such as a guidewire) into a stenosis region model, the stenosis region model provided in each groove 22 is pushed in the direction of the exit, each shape transition portion 222 functions as a stopper. Consequently, it is possible to stably dispose the stenosis region model in a holding die, and, thus, to further increase the precision of PCI training.

The groove path portion 223 of each groove 22 includes the corresponding groove curved portion 224. Therefore, compared to when each groove portion 22 is linear over its entire length, each groove curved portion 224 functions as a stopper like each shape transition portion 222. Consequently, it is possible to stably dispose the stenosis region model in the holding die, and, thus, to further increase the precision of PCI training.

Although, from the viewpoint of visibility for observing a stenosis region model from outside the holding die, it is desirable that each groove curved portion 224 be curved, a bent portion may be alternatively formed.

As shown in FIG. 2A, the first member 21A and the second member 21B of the holding die each have the corresponding curved portion 211. Therefore, a side surface of the holding die is positioned parallel to the groove path portions 223 of the corresponding grooves 22. Consequently, when observing the stenosis region model from outside the holding die, the thickness of the holding die becomes the same in the direction of the side surface. Since light transmittance can be kept constant, it is possible to ensure visibility of the stenosis region model, and, thus, to further increase the precision of PCI training.

Next, a vascular stenosis model 31 according to a third embodiment will be described with reference to FIGS. 3A to 3C while focusing on its differences from the first embodiment and the second embodiment. Portions corresponding to those of the second embodiment will be given the same reference numerals in FIGS. 3A to 3C.

Figure 3A:
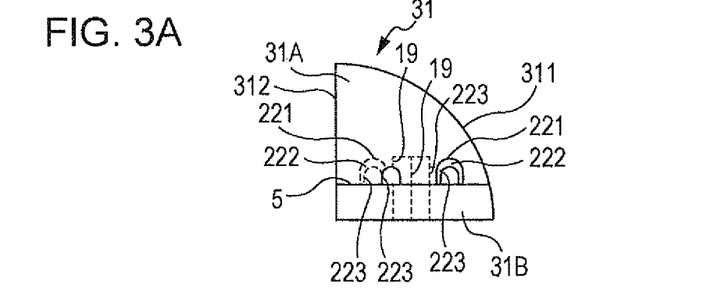
FIGS. 3A to 3C are structural views of a third embodiment of the present invention, with FIG. 3A being a front view of a vascular stenosis model, FIG. 3B being a plan view of the vascular stenosis model, and FIG. 3C being a right side view of the vascular stenosis model.
Figure 3B:
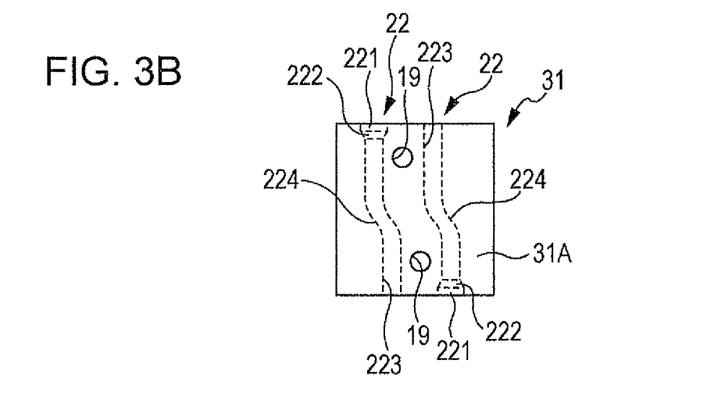
Figure 3C:
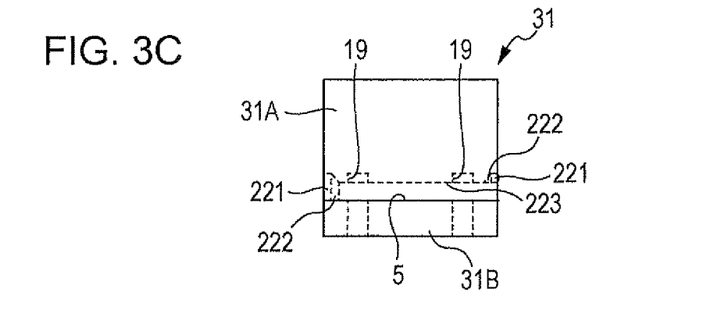

For the sake of easier understanding, in FIGS. 3A to 3C, with the scales of the vascular stenosis model 31 in a lengthwise direction and a widthwise direction being changed, the entire vascular stenosis model 31 is schematically illustrated as a whole. Therefore, the overall dimensions may differ from the actual dimensions.

FIG. 3A is a front view of the vascular stenosis model 31. FIG. 3B is a plan view of the vascular stenosis model 31. FIG. 3C is a side view (right side view) of the vascular stenosis model 31. As shown in FIGS. 3A to 3C, the vascular stenosis model 31 differs from the vascular stenosis model 21 according to the second embodiment in that, in transverse cross section, a holding die of the vascular stenosis model 31 has a fan shape including a curved portion 311 and a linear portion 312; and securing holes 19 are provided so as to extend from a second member (lower die) to a first member (upper die) of the holding die.

In the embodiment, the fan shape of the holding die in transverse sectional view is formed over the entire holding die in which a first member 31A and a second member 31B of the holding die are integrally formed. Alternatively, in other embodiments the first member 31A may have a fan shape.

Accordingly, in transverse sectional view, the holding die of the vascular stenosis model 31 has a fan shape. Therefore, it is possible to further increase visibility when observing a stenosis region model from a side where a curve 311 of the fan shape of the holding die is formed, and, thus, to further increase precision of PCI training.

The securing holes 19 are provided so as to extend from the second member (lower die) to the first member (upper die) of the holding die. Therefore, when the holding die is viewed from above, the securing holes 19 are not easily visible. Consequently, it is possible to further increase visibility of a stenosis region model, and, thus, to further increase the precision of PCI training.

When the securing holes 19 are provided so as to extend from the second member (lower die) to the first member (upper die), from the viewpoint of increasing visibility of the stenosis region model provided in the grooves 22, it is desirable to dispose the grooves 22 at the upper side of a boundary 5 in transverse sectional view of the holding die.

Next, a vascular stenosis model 41 according to a fourth embodiment will be described with reference to FIGS. 4A to 4C while focusing on its differences from the third embodiment. Portions corresponding to those of the third embodiment will be given the same reference numerals in FIGS. 4A to 4C.

Figure 4A:
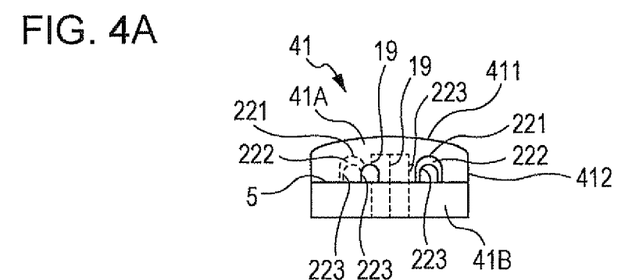
FIGS. 4A to 4C are structural views of a fourth embodiment of the present invention, with FIG. 4A being a front view of a vascular stenosis model, FIG. 4B being a plan view of the vascular stenosis model, and FIG. 4C being a right side view of the vascular stenosis model.
Figure 4B:
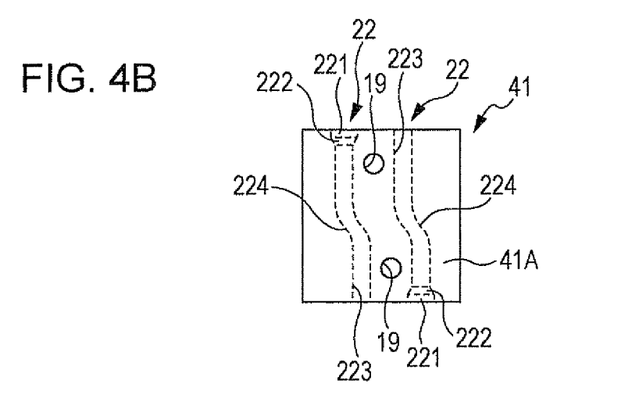
Figure 4C:
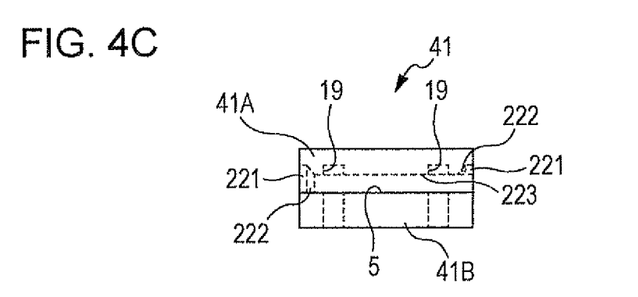

For the sake of easier understanding, in FIGS. 4A to 4C, with the scales of the vascular stenosis model 41 in a lengthwise direction and a widthwise direction being changed, the entire vascular stenosis model 41 is schematically illustrated as a whole. Therefore, the overall dimensions may differ from the actual dimensions.

FIG. 4A is a front view of the vascular stenosis model 41. FIG. 4B is a plan view of the vascular stenosis model 41. FIG. 4C is a side view (right side view) of the vascular stenosis model 41. As shown in FIGS. 4A to 4C, the vascular stenosis model 41 differs from the stenosis region model 31 according to the third embodiment in that, in transverse sectional view, a holding die of the vascular stenosis model 41 has a semicircular shape including a curved portion 411 that is positioned at an upper surface and linear portions 412 that are positioned on both sides of the curved portion 411.

Accordingly, since, in transverse sectional view, the holding die of the vascular stenosis model 41 has a semicircular shape, the semicircular curved portion 411 is formed at a top surface of the first member 41A of the holding die. Therefore, it is possible to greatly increase visibility when observing a stenosis region model from both side surfaces, and, thus, to greatly increase the precision of PCI training.

Although, in the embodiment, the semicircular curved portion 411 in transverse sectional view of the holding die of the vascular stenosis model 41 is only formed at the first member, the vascular stenosis model 41 need not be limited thereto. In fact, the semicircular curved portion 411 may be formed at the second member. Further, the semicircular shape may be the same as either of the semicircular shape of each groove 12 illustrated in FIG. 1E.

Next, a vascular stenosis model 51 according to a fifth embodiment will be described with reference to FIG. 5A while focusing on its differences from the fourth embodiment. Portions corresponding to those of the fourth embodiment will be given the same reference numerals in FIG. 5A.

Figure 5A:
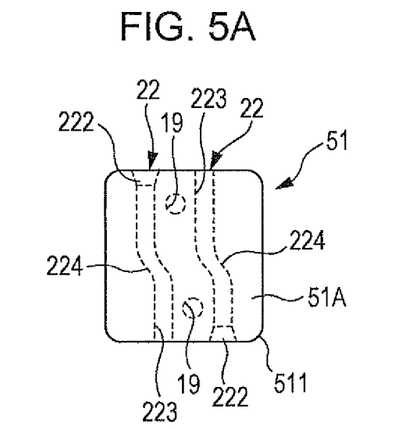
FIGS. 5A and 5B illustrate other embodiments, with FIG. 5A being a plan view of a fifth embodiment and FIG. 5B being an oblique projection of a sixth embodiment.

For the sake of easier understanding, in FIG. 5A, with the scales of the vascular stenosis model 51 in a lengthwise direction and a widthwise direction being changed, the entire vascular stenosis model 51 is schematically illustrated as a whole. Therefore, the overall dimensions may differ from the actual dimensions.

FIG. 5A is a plan view of the vascular stenosis model 51. As illustrated in FIG. 5A, the vascular stenosis model 51 according to the fifth embodiment differs from the vascular stenosis model 41 according to the fourth embodiment in that a portion corresponding to the apex of a substantially square shape of a first member 51A has a curved surface including a curved portion 511; each groove 22 includes a shape transition portion 222 extending from an entrance towards an exit, and a groove path portion 223; and each groove 22 does not include an enlarged opening 221.

Accordingly, in plan sectional view (that is, in sectional view in a direction from the first member 51A towards a second member 51B of a holding die), the vascular stenosis model 51 according to the fifth embodiment is such that the apex of the substantially square shape is formed at the curved surface including the curved portion 511. Therefore, edge portions of the portion corresponding to the apex of the substantially square shape of the holding die are not visible when viewing a stenosis region model from the apex of the substantially square shape of the vascular stenosis model 51. Therefore, it is possible to further increase visibility of the stenosis region model and, thus, to further increase the precision of PCI training.

Each groove 22 includes a shape transition portion 222 and a groove path portion 223 from an entrance towards an exit. Therefore, as in each groove 22 of the vascular stenosis model 21 according to the second embodiment, even if, when inserting a medical device (such as a guidewire) into a stenosis region model, the stenosis region model provided in each groove 22 is pushed in the direction of the exit, each shape transition portion 222 functions as a stopper. Therefore, it is possible to stably dispose the stenosis region model in the holding die, and, thus, to further increase the precision of PCI training.

Next, a vascular stenosis model 61 according to a sixth embodiment will be described with reference to FIG. 5B while focusing on its differences from the fifth embodiment. Portions corresponding to those of the fifth embodiment will be given the same reference numerals in FIG. 5B.

Figure 5B:
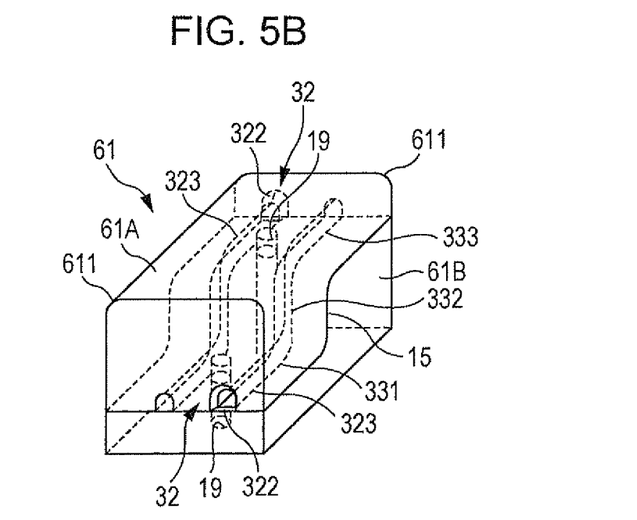

For the sake of easier understanding, in FIG. 5B, with the scales of the vascular stenosis model 61 in a lengthwise direction and a widthwise direction being changed, the entire vascular stenosis model 61 is schematically illustrated as a whole. Therefore, the overall dimensions may differ from the actual dimensions.

FIG. 5B is an oblique projection of the vascular stenosis model 61. As shown in FIG. 5B, the vascular stenosis model 61 according to the sixth embodiment differs from the vascular stenosis model 51 according to the fifth embodiment as follows. That is, since a first member 61A and a second member 61B of a holding die are three-dimensionally joined together, a boundary 15, which defines a joined surface, defines a three-dimensional shape having height; and, since the boundary 15 defines the three-dimensional shape, a groove path portion 323 of each groove 32 has a three-dimensional shape extending through a lower bottom portion 331, a vertical portion 332, and an upper bottom portion 333 from the near side of the vascular stenosis model 51.

As mentioned above, each groove 32 has a three-dimensional shape extending through the lower bottom portion 331, the vertical portion 332, and the upper bottom portion from the near side of the vascular stenosis model 61. Here, in relation to the boundary 15, the lower bottom portion 331 and the upper bottom portion 333 of each groove 32 are positioned at the upper side of the boundary 15 (as viewed from a bottom surface of the second member (lower die) 61B towards the first member (upper die) 61A). Although the lower surface of each groove 32 is disposed so as to contact the boundary 15, the lower surface of each groove 32 may be provided so as to be separated from the boundary 15 at the upper side of the boundary 15. The vertical portion 332 of each groove 32 is positioned at the upper side of the boundary 15. As used herein, "upper side" means the near side of the vascular stenosis model 61 illustrated in the oblique projection. The grooves 32 are positioned at the upper side of the boundary 15. Therefore, it is possible to increase visibility when a stenosis region model is viewed from outside the holding die, and, thus, to increase the precision of PCI training.

When the boundary 15 defining the joined surface provides height (each vertical portion 332), the groove path portion 323 of each groove 32 has a three-dimensional shape extending through the lower bottom portion 331, the vertical portion 332, and the upper bottom portion 333. Therefore, it is possible to perform more complicated PCI training, and, thus, to greatly increase the precision of the PCI training. Further, each groove path portion 323 having this three-dimensional shape can provide the same advantages as when the groove curved portion 224 of each groove 22 of the vascular stenosis model 21 according to the second embodiment are provided. That is, even if, when inserting a medical device (such as a guidewire) into a stenosis region model, the stenosis region model provided in each groove 32 is pushed in the direction of the exit, each groove path portion 323 having the three-dimensional shape functions as a stopper as with the groove curved portion 224 of each groove 22 of the vascular stenosis model 21 according to the second embodiment. That is, even if, when inserting a medical device (such as a guidewire) into a stenosis region model, the stenosis region model provided in the grooves 22 is pushed in the direction of the exit, each groove path portion 323 having the three-dimensional shape functions as a stopper as with the groove curved portion 224 of each groove 22 of the vascular stenosis model 21. Therefore, it is possible to further stably dispose the stenosis region model in a holding die, and, thus, to further increase the precision of PCI training.

The present invention is not limited to the above-described embodiments, so that various modifications can be made by a person having ordinary skill in the art that are within the technical idea of the present invention.

For example, in the vascular stenosis model according to any one of first to sixth embodiments, all surfaces of the edge portions of the first member (upper die) except the surface that contacts the second member (lower die) may be curved. Thus, when the stenosis region model is observed from above the holding die (in the direction from the first member towards the second member), a case in which the edge portions of the first member overlap the field of view of the grooves does not occur. Therefore, it is possible to increase visibility of the stenosis region model, and, thus, to further increase the precision of PCI training.

Further, it is possible to provide a groove curved portion at the groove path portion 323 of each groove 32 of the vascular stenosis model 61 according to the sixth embodiment. This causes each groove path portion 323 having a three-dimensional shape and having the groove curved portion provided thereat to function as a stopper. This makes it possible to further stably dispose the stenosis region model in the holding die, and to perform more complicated PCI training as a result of each groove path portion 323 becoming more complicated. Therefore, it is possible to further increase the precision of PCI training.

While the foregoing embodiments have been shown and described in detail, the foregoing description is in all aspects illustrative and not restrictive. It is therefore understood that numerous modifications and variations can be devised without departing from the spirit and scope of the foregoing embodiments.

What is claimed is:

1. A vascular stenosis model comprising:
 a stenosis region model; and
 a transparent holding die including at least one groove configured to hold the stenosis region model, wherein
  the transparent holding die includes a first member and a second member that are separable from each other, and
  in a vertical sectional view of the transparent holding die, the at least one groove is positioned at either an upper side or a lower side of a boundary between the first member and the second member.

2. The vascular stenosis model according to claim 1, wherein the at least one groove does not comprise edge portions that are positioned at vertices in a rectangular section in a transverse sectional view.

3. The vascular stenosis model according to claim 1, wherein the at least one groove includes a portion near an entrance thereof that opens so as to become wider from an exit towards the entrance.

4. The vascular stenosis model according to claim 2, wherein the at least one groove includes a portion near an entrance thereof that opens so as to become wider from an exit towards the entrance.

5. The vascular stenosis model according to claim 1, wherein the holding die has a fan shape in a transverse sectional view.

6. The vascular stenosis model according to claim 1, wherein the holding die is semicircular in a transverse sectional view.

7. The vascular stenosis model according to claim 2, wherein that at least one groove is of a U-shaped form in a transverse section view so that a center of a virtual circle containing a curved portion of the U-shaped form is positioned at a same side of the boundary as the at least one groove.

* * * * *